United States Patent [19]

Jarvis et al.

[11] Patent Number: 4,869,980

[45] Date of Patent: Sep. 26, 1989

[54] MAGNESIUM/MANGANESE DIOXIDE ELECTROCHEMICAL CELL

[75] Inventors: Louis P. Jarvis, Tinton Falls; Michael T. Brundage, Freehold; Terrill B. Atwater, North Plainfield, all of N.J.

[73] Assignee: The United States of America as represented by the Secretary of the Army, Washington, D.C.

[21] Appl. No.: 270,147

[22] Filed: Nov. 10, 1988

Related U.S. Application Data

[63] Continuation-in-part of Ser. No. 181,604, Apr. 14, 1988.

[51] Int. Cl.⁴ .............................................. H01M 6/08
[52] U.S. Cl. ..................................... 429/202; 429/224
[58] Field of Search ............... 429/202, 206, 207, 224, 429/229, 188, 218

[56] References Cited

U.S. PATENT DOCUMENTS

| | | | |
|---|---|---|---|
| 2,612,534 | 9/1952 | Blake | 429/202 X |
| 2,612,537 | 9/1952 | Blake | 429/202 X |
| 2,616,940 | 11/1952 | Reid | 429/202 X |
| 2,621,220 | 12/1952 | Kirk et al. | 429/202 X |
| 3,025,336 | 3/1962 | Bartosh et al. | 429/202 X |
| 3,450,569 | 6/1969 | Dumas et al. | 429/202 X |

Primary Examiner—Anthony Skapars
Attorney, Agent, or Firm—Michael J. Zelenka; Roy E. Gordon

[57] ABSTRACT

A magnesium/manganese dioxide electrochemical cell that has been stored following partial usage is improved by increasing the cathode moisture content at the time of making the cell to reduce the self discharge and increase the operating capacity after the cell has been stored following partial usage.

1 Claim, No Drawings

MAGNESIUM/MANGANESE DIOXIDE ELECTROCHEMICAL CELL

The invention described herein may be manufactured, used and licensed by or for the Government for governmental purposes without the payment to use of any royalty thereon.

This application is a continuation-in-part application of of U.S. patent application Ser. No. 181,604, filed Apr. 14, 1988, now abandoned.

This invention relates in general to an improved magnesium/manganese dioxide electrochemical cell and in particular to such a cell in which the self discharge is reduced and the operating capacity increased after the cell has been stored following partial usage.

BACKGROUND OF THE INVENTION

The demand for improved energy storage systems has increased greatly with the evolution of new equipment requiring new and improved battery systems as a power source. Critical characteristics that power sources must accommodate are low cost, high energy density, light weight, and good storability.

The present magnesium/manganese dioxide electrochemical system provides high energy density at low cost. It is similar in construction to the cylindrical zinc-carbon cell. That is, a magnesium alloy can, containing small amounts of aluminum and zinc, is used in place of the zinc can. The cathode includes an extruded mix of manganese dioxide, acetylene black for conductivity and moisture retention, barium chromate, and magnesium hydroxide. The electrolyte is an aqueous solution of magnesium perchlorate or magnesium bromide with lithium chromate. A carbon rod serves as the cathode current collector. The separator is an absorbent kraft paper as in the paper-lined zinc cell structure. Sealing of the magnesium cell is critical, as it must be tight to retain all moisture during storage but provide a means for the escape of hydrogen gas which forms as the result of the corrosion reaction during the discharge. This is accomplished by a mechanical vent—a small hole in the plastic top seal washer under the retainer ring which is deformed under pressure, releasing the excess gas. However, the present magnesium/manganese dioxide battery suffers great capacity loss of up to 66 percent during intermittent storage periods following partial usage. This reduction in operating capacity occurs because the moisture content of the cathode mix, which is very critical in the electrochemical reaction, is reduced as a result of the reaction:

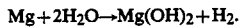

$Mg + 2H_2O \rightarrow Mg(OH)_2 + H_2$.

SUMMARY OF THE INVENTION

The general object of this invention is to provide an improved magnesium/manganese dioxide electrochemical cell. A more particular object of the invention is to provide such an improved cell for use in the area of low cost, high energy storage. A still further object of the invention is to provide such a cell in which the self discharge is reduced and the operating capacity is increased after the cell has been stored following partial usage. A particular object of the invention is to provide such an improved cell for portable communication equipment.

It has now been found that the aforementioned objects can be attained by increasing the cathode moisture content of the magnesium/manganese dioxide electrochemical cell. That is, according to the invention, distilled water is added to the cathode mix of a magnesium/manganese dioxide electrochemical cell to increase the cathode moisture content from 34 to 38 percent. This results in a cell in which the self discharge rate is reduced and the operating capacity increased when the cells are stored following partial usage.

DESCRIPTION OF THE PREFERRED EMBODIMENT

A standard magnesium/manganese dioxide electrochemical cell is provided in which a 2% Al - 1% Zn alloy of magnesium is the anode, a moist cathode mix of carbon black, manganese dioxide, magnesium hydroxide, barium chromate and lithium chromate is the cathode and 3.5 to 4.0 normal magnesium perchlorate is the electrolyte. A magnesium can is selected as the anode that is an alloy of 97 percent magnesium, 2 percent aluminum, and 1 percent zinc. The can weighs approximately 8 grams. A cathode mix is made of 9 parts manganese dioxide, 1 part carbon black and 1 to 3 parts magnesium hydroxide. To this mix is added 4 Normal magnesium perchlorate (with barium chromate additive) and distilled water to give a water to cathode mix ratio of 34 percent. This paste is then injected into the magnesium can to give a total cell weight of 41 grams. A carbon rod that serves as a current collector is inserted into the middle of the can. The moisture content of the cell is found to be 34 percent as determined by Karl Fisher titration. To this standard $Mg/MnO_2$ cell is now added 1.5 to 2 grams of distilled water raising the moisture content to approximately 38 percent. This cell inherently undergoes great capacity loss of up to 60 percent during intermittent periods of non-use, following partial usage. Increasing the cathode moisture content from 34 to 38 percent by weight at the time of making the cell decreases the self-discharge rate to 20 percent. For example, magnesium/manganese dioxide cells with no additional distilled water added to the cathode mix, self-discharged at a rate of 1.41 hours per week. This occurred during intermittent storage periods following partial usage of 6.00 hours at zero degrees Fahrenheit and 0.065 amp constant current. On the other hand, identical cells, but with 1.50 grams of distilled water added to the cathode mix prior to discharge suffered a capacity loss of only 1.12 hours per week.

Moreover, magnesium/manganese dioxide electrochemical cells with no additional water in the cathode mix delivered an average of 16.08 hours when discharged at 0.065 amp at zero degrees Fahrenheit with an intermittent storage period of four weeks. On the other hand, identical cells with 1.50 grams of distilled water added to the cathode mix delivered an average of 19.87 hours.

We wish it to be understood that we do not desire to be limited to the exact details as described for obvious modifications will occur to a person skilled in the art.

What is claimed is:

1. In a magnesium/manganese dioxide electrochemical cell that has been stored following partial usage and including an alloy of magnesium as the anode, a moist cathode mix of carbon black, manganese dioxide, magnesium hydroxide, barium chromate and lithium chromate as the cathode, and 3.5 to 4.0 normal magnesium perchlorate as the electrolyte, the improvement of increasing the moisture content of the cathode mix from 34 to 38 percent at the time of making the cell to reduce the self discharge and increase the operating capacity after the cell has been stored following partial usage.

* * * * *